July 3, 1923.

S. WOOD

LOG RAFT

Filed July 22, 1921

INVENTOR
STANLEY WOOD
BY
ATTYS.

July 3, 1923.
S. WOOD
LOG RAFT
Filed July 22, 1921
1,460,779
2 Sheets-Sheet 2
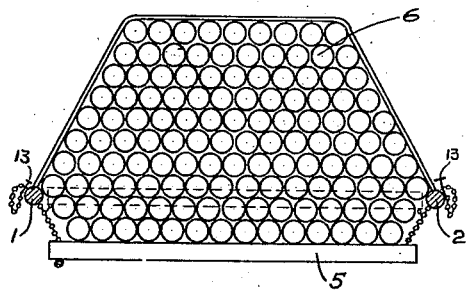
Fig. 4.
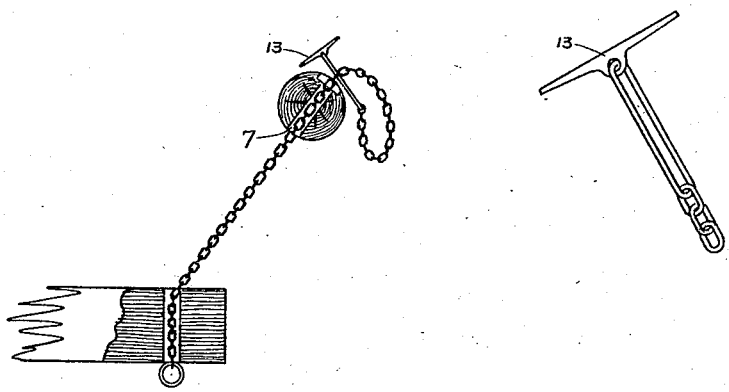
Fig. 5.
Fig. 6.
INVENTOR
STANLEY WOOD
BY Fetherstonhaugh & Co
ATTORNEYS Patented July 3, 1923.

1,460,779

UNITED STATES PATENT OFFICE.

STANLEY WOOD, OF VICTORIA, BRITISH COLUMBIA, CANADA.

LOG RAFT.

Application filed July 22, 1921. Serial No. 486,831.

*To all whom it may concern:*

Be it known that I, STANLEY WOOD, a subject of the King of Great Britain, and a resident of the city of Victoria, in the Province of British Columbia, Canada, have invented certain new and useful Improvements in Log Rafts, of which the following is a specification.

My invention relates to improvements in log rafts, and the object of my invention is to devise a raft for the transportation of logs the draft of which may be controlled and adjusted to suit varying depths of water for loading or discharging and which is perfectly flat bottomed so as to enable an even draft to be obtained.

I attain this object by the construction illustrated in the accompanying drawings in which—

Figure 2:
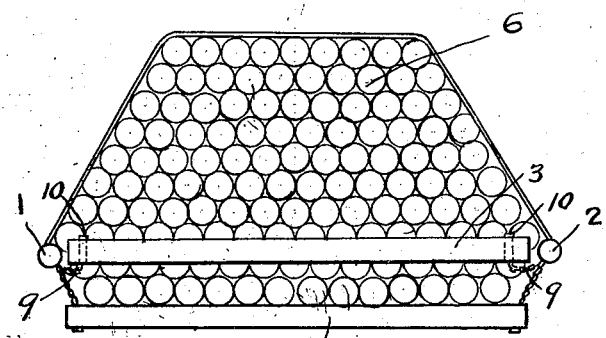
Figure 2 is an end view of the raft loaded.
Figure 3:
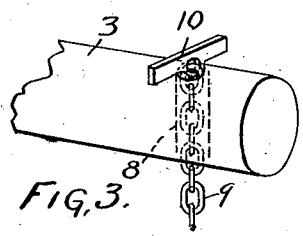
Figure 3 is a fragmentary perspective view of one of the end booms and attached chains.

Figure 4 is a cross sectional view of the loaded raft shown in Figure 2. Figure 5 is a sectional detail view showing the adjustable chain connection between the side and end booms. Figure 6 is a view of one of the fastening chains.

Similar figures of reference indicate similar parts in the views.

Figure 1:
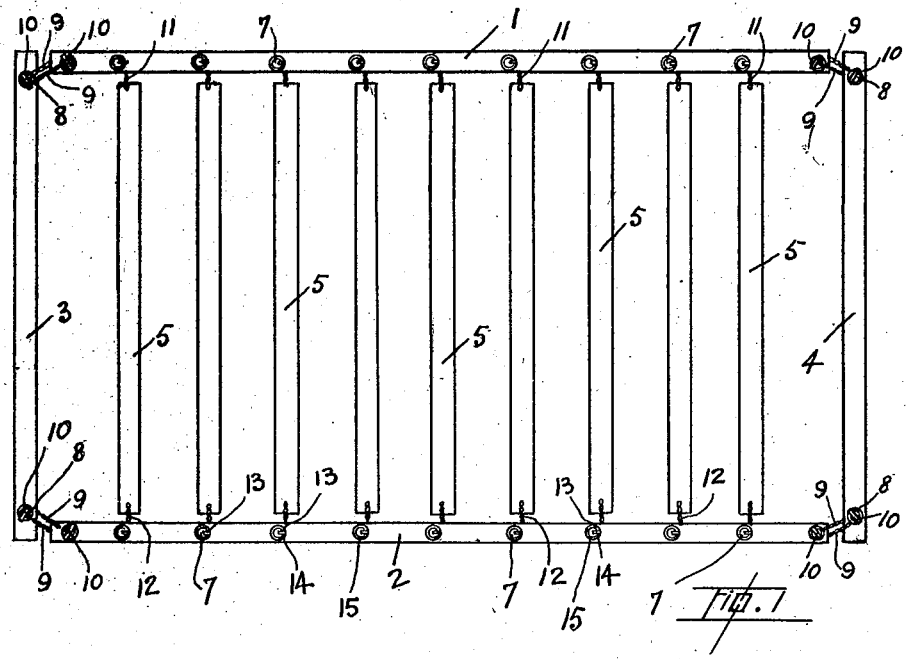
Fig. 1 is a plan view of the raft, empty.

The raft consists of the two longitudinal side booms 1 and 2, the two transverse end booms 3 and 4, and the transverse intermediate booms 5, the said transverse booms 3, 4 and 5, forming the floor of the raft on which the body of logs 6 is supported. The side booms 1 and 2 are each provided with a plurality of spaced vertical openings 7, while the end booms 3 and 4 have vertical openings 8 provided in them adjacent their opposite ends, and the ends of the side booms are connected to the contiguous ends of the end booms by double chains 9, as shown in Fig. 1, one chain being secured at one end to the end boom and having its opposite end passed up through the end opening of the side boom, while the other chain is fastened at one end to the side boom and has its other end passed up through the end opening of the end boom. The free ends of each of the chains are provided with a cross bar, indicated by the numeral 10, which when straddled across its respective opening, prevents the chain from dropping back through the opening.

The transverse intermediate booms 5, which are of such length as to fit between the side booms 1 and 2 are as many in number as there are openings 7, excepting the end openings, and each boom is provided at its opposite ends with chains 11 and 12, respectively, the free ends of which are passed up through the respective openings 7, each free end being provided with a bar 13 adapted to be seated in a notch 14 formed in the upper edge of a cylindrical lining 15 with which each opening is fitted so that the chains are thus prevented from inadvertently dropping back through the respective openings.

It will thus be seen that a raft floor is formed by the end booms and transverse booms which is provided with floating side booms 1 and 2 which are attached to the raft floor by a plurality of chains all of which may be adjusted lengthwise.

Before loading the raft floor with logs, the minimum depth of water through which the raft has to pass, is ascertained, the chains connecting the raft floor and side booms are adjusted, so that when the floor is submerged by its superimposed load the chains will be held taut between the floor and the side booms, and the side booms will be left floating. By this means the raft will be so loaded that it may be safely towed without touching bottom as the boom floor is perfectly level and the draft thereof is prescribed within the predetermined limits.

The side booms and their depending chains may be taken as a loading gauge for the raft, the side booms remaining afloat only so long as the load is less than the amount required to keep within a given draft.

What I claim as my invention is:—

1. A log raft comprising side booms, a log supporting floor suspended between said booms, and means for raising or lowering said floor.

2. A log raft comprising side booms, end booms disposed transversely across and adjacent the ends of the side booms, spaced booms disposed transversely between the side booms, flexible connections between the ends of the end booms and the side booms and between the side booms and the respective spaced booms, and means whereby the length of said connections may be varied to raise or lower the end booms and the spaced booms.

3. A log raft adjustable to adapt the same to varying depth of water, said raft comprising side booms and floor booms suspended from the side booms, the suspending means being effective to adjust the raft, and serving in conjunction with the side booms as a loading gauge for indicating the degree to which the raft may be loaded within a given draft.

Dated at Victoria, B. C., this 7 day of July, 1921.

STANLEY WOOD.